Patented May 28, 1946

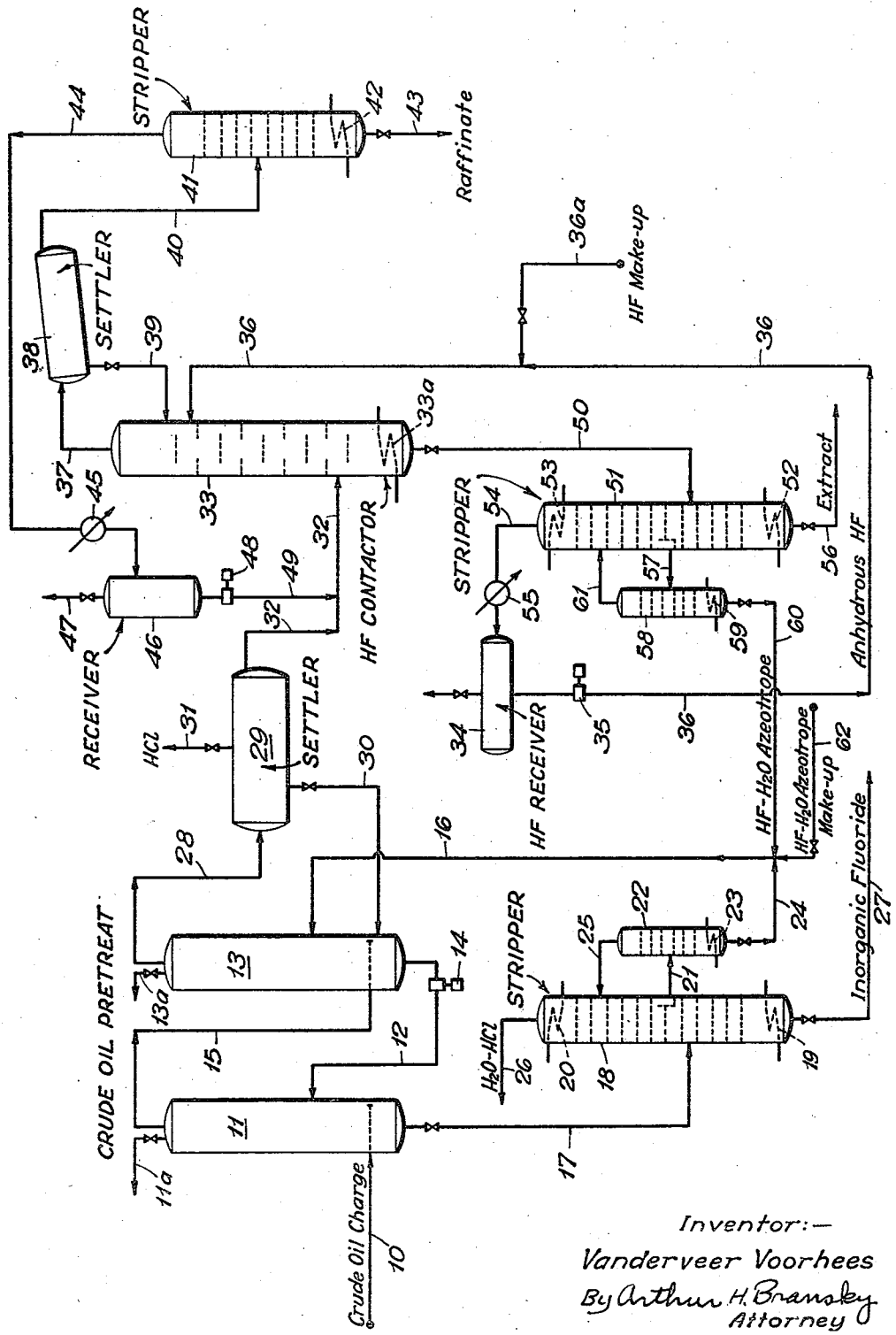

2,400,986

UNITED STATES PATENT OFFICE 2,400,986

DESALTING CRUDE OIL

Vanderveer Voorhees, Homewood, Ill., assignor to Standard Oil Company, Chicago, Ill., a corporation of Indiana Application July 14, 1945, Serial No. 605,067

11 Claims. (Cl. 196—4)

This invention relates to improvements in the removal of inorganic salts and/or water from crude oils, particularly crude petroleum oils. Inorganic salts in the form of chlorides of sodium, magnesium and/or calcium are frequently associated with crude petroleum oils, usually in the form of a salt brine emulsified with oil, or in the form of crystalline salts, usually surrounded by an oil film. The removal of salt from such crude oils by the usual methods presents difficult problems. For example, when contacting the salt-containing crude oil with water, the oil film upon the salt particles prevents the water from coming in contact with the salt crystal and as a consequence, methods employing the washing of crude oil with water are not effective. Even the addition of a demulsifying agent to the water frequently has relatively small effect. The present invention provides a method for reducing the water and salt content of crude oil to a relatively low figure.

The removal of salt from crude oils prior to any distillation process, such as a cracking process, is desirable since the presence of these salts, particularly when the concentration thereof exceeds about 20 pounds of salt per 1000 barrels of oil gives rise to considerable difficulties. They form deposits upon the heating surfaces and in the tubes of the heating equipment, such as stills, heat exchangers, and the like, reducing the efficiency thereof; such deposits plug lines and give rise to serious corrosion problems.

It is an object of the invention to provide an improved method of removing water and salt from crude oils. Another object of the invention is to provide a method of removing water and inorganic salts, such as chlorides of sodium, magnesium and/or calcium from crude petroleum oils. Still another object of the invention is to provide a method of obtaining crude petroleum oils of relatively low water and salt-content from crude petroleum oils containing relatively large amounts of water and inorganic salts, while combining this process with extraction of the oil with anhydrous HF in a later stage.

In accordance with the present invention, water and/or salt-containing crude petroleum oils, particularly such oils having more than about 20 pounds of salt per 1000 barrels of oil, are effectively desalted and substantially freed of water by treating the same with hydrogen fluoride and water azeotropic or constant boiling mixture, although aqueous hydrogen fluoride containing from about 15% to about 50%, and preferably above 25% hydrogen fluoride can be used. The presence of large amounts of inorganic chlorides, such as sodium, calcium and magnesium chlorides in crude oils is highly undesirable since as hereinbefore stated, the presence of such salts in oils subjected to various distillation and/or heating processes undergo hydrolysis which produces hydrochloric acid. Dry hydrochloric acid itself does little damage, but when dissolved in water it becomes very corrosive. Raw petroleum crude oil as obtained from the oil well contains relatively large amounts of water, usually emulsified with the oil. Usually the bulk of the water in crude oil is separated therefrom by placing the oil and water mixture in a settling tank and permitting the oil and aqueous phases to separate. Other well-known means are often employed. The treatment of water and salt-containing crude oils with an azeotropic mixture of hydrogen fluoride and water provides a unique method of simultaneously freeing the crude oil of its major proportion of water and inorganic salts and in many cases results in a crude oil substantially free of water and inorganic salts. Hydrogen fluoride forms an azeotrope with water which contains about 36% by weight of hydrogen fluoride and boils at about 248° F. at atmospheric pressure. This azeotrope or constant boiling mixture, is capable of taking up additional water, which property makes it particularly well-suited for the herein-described purpose. The treatment of salt-containing crude oil with the hydrogen fluoride converts the metal chlorides, particularly the alkali metal and the alkaline-earth metal chlorides to the water insoluble fluorides. These inorganic fluorides being less readily hydrolyzed than are the chlorides do not form corrosive products; furthermore, any of the remaining inorganic salts settle out more readily due to the emulsion destabilizing effect of the hydrogen fluoride azeotrope treatment.

Azeotropic aqueous hydrofluoric acid is invariably available in plants wherein hydrocarbons are processed with hydrogen fluoride, since the hydrocarbon feed stocks or co-reactants nearly always contain some water. Hydrogen fluoride being extremely hygroscopic absorbs water in the course of processing. These water solutions of hydrofluoric acid must generally be removed from the hydrogen fluoride to preserve its activity for the process in question. Removal of this water is most conveniently effected by simple distillation to produce the constant boiling water-HF mixture as a residue. The hydrogen fluoride water mixture resulting from the dehydration and desalting of crude oil treatment with a hydrogen fluoride water azeotrope can be distilled to give a side cut having substantially the composition of the hydrogen fluoride water azeotrope which can then be recycled for further use in dehydrating and desalting crude oil. The process of the present invention can be carried out in one or more stages, concurrently or countercurrently. Conventional equipment for example, empty or packed towers or mixing equipment, can be used.

Suitable operating temperatures fall within the range of from about 0° F. to about 200° F. and preferably within the range of about 60° F. to about 100° F., temperatures of about 65° F. to about 75° F. having been found particularly well suited for this process. Depending upon the reaction temperatures and the concentration of hydrogen fluoride employed, pressures of from about atmospheric pressure to about 150 pounds per square inch can be used in the contacting step with contact time varying from about 1 minute to about 120 minutes or more. The amount of hydrogen fluoride employed in the reactor should be sufficient to maintain an aqueous hydrogen fluoride mixture having a concentration of from about 15% to about 50%, preferably about 36% hydrogen fluoride.

Briefly, the present invention comprises contacting crude oil containing water and inorganic chlorides with a hydrogen fluoride-water mixture containing from about 15% to about 50% hydrogen fluoride, and preferably a constant boiling mixture thereof, separating as a raffinate a crude oil substantially free of water and inorganic salts, which is ready for further processing, and an extract phase comprising aqueous hydrogen fluoride containing dissolved therein inorganic fluorides, and distilling the extract phase to recover the hydrogen fluoride-water azeotrope and a bottoms comprising substantially inorganic fluorides. HCl resulting from the reaction is eliminated as a gas or as a water solution.

The present invention will be described in connection with the accompanying drawing which forms a part of this specification and illustrates diagrammatically an arrangement for carrying out the invention, the description serving to exemplify the same. A crude oil containing water, inorganic chlorides and other undesirable salts, for example, 100 to 200 lbs. per 1000 barrels is introduced via line 10 into the bottom portion of a contactor 11 containing a body of aqueous hydrogen fluoride introduced thereinto through line 12 from a contactor 13 by means of a pump 14. After passing through the aqueous hydrogen fluoride in the contactor 11 the crude oil is passed via line 15 to the bottom portion of contactor 13 containing a body of hydrogen fluoride-water azeotrope introduced via line 16 from a source hereinafter described. Contactors 11 and 13 are maintained at a temperature of from about 32° F. to about 100° F., preferably from about 70° F. to about 80° F. by suitable means (not shown) and under a pressure sufficient to maintain the reactants in the liquid phase. Under these conditions, the inorganic chlorides are converted to the corresponding fluorides with formation of hydrogen chloride. The latter may be removed from the system through vents 11a and/or 13a. While I have shown a two-stage contacting step for treating the crude oil with the hydrogen fluoride-water azeotrope, it is to be understood that a suitable countercurrent extraction tower can be suitably substituted therefor. If desired, the crude oil if very viscous can be diluted with a diluent such as hexane, naphtha or a liquefied normally gaseous hydrocarbon, such as propane, prior to the contacting stage.

The bottoms from contactor 11 comprising aqueous hydrogen fluoride containing inorganic fluorides is withdrawn from contactor 11 via line 17 and introduced into a stripper 18 provided with heating means 19 in the bottom portion thereof and cooling or dephlegmating means 20 in the upper portion thereof. A bottom temperature of about 250° F. to 300° F. is maintained in the bottom of stripper 18 while a temperature of from about 50° F. to about 100° F. is maintained in the top portion of the stripper 18 by means of the dephlegmating coils 20. An aqueous hydrogen fluoride side stream is withdrawn from the stripper 18 via line 21 and introduced into side stripper or reboiler 22 provided with heating coils 23 for maintaining a temperature of about 248° F. for withdrawing a constant boiling hydrogen fluoride-water stream via line 24, which if desired can be recycled to the contactor 13 via line 16. The overhead from stripper 22 is returned to the stripper 18 via line 25. Water and/or aqueous hydrogen chloride is taken off from the top of the stripper 18 through a line 26, while inorganic fluorides are withdrawn from the bottom of stripper 18 through a line 27.

The treated crude oil from the contactor 13 substantially free of inorganic salts and water, is withdrawn from the contactor 13 via line 28 and introduced into a settler 29 to facilitate the separation of any aqueous hydrogen fluoride which may be carried over with the treated crude oil. Any aqueous hydrogen fluoride separating in the settler 29 is withdrawn therefrom and returned to the contactor 13 via line 30. Hydrogen chloride, formed in the conversion of the inorganic chlorides to the fluorides, is vented from the system through line 31. By eliminating the hydrogen chloride from the system at this point and from the stripper 18 and the contactors, as hereinbefore described, hydrochloric acid corrosion difficulties in subsequent equipment are substantially eliminated.

The treated crude oil from the settler 29 may be subjected to any desired subsequent treatment. As an example of such subsequent treatment, the crude oil, substantially freed of inorganic salts and water may be subjected to extraction with anhydrous hydrogen fluoride, and the extract therefrom heated to obtain a hydrogen fluoride-water azeotrope which may be recycled to the crude oil desalting stage. Thus the desalted and dehydrated crude oil from the settler 29 can be withdrawn therefrom through line 32 and introduced into contactor 33, wherein it is countercurrently contacted with anhydrous hydrogen fluoride introduced into the upper portion from the hydrogen fluoride receiver 34 via pump 35 and line 36. Anhydrous hydrogen fluoride make-up, if necessary, can be introduced into the system via line 36a. The contactor 33 can be maintained at a temperature of from about 0° F. to about 150° F. and preferably from about 70° F. to about 90° F. by means of coils 33a and under a pressure sufficient to maintain the products in the liquid phase. A raffinate is withdrawn from the top of contactor 33 through a line 37 and introduced into a settler 38 wherein any hydrogen fluoride extract, which may have been carried over with the raffinate is permitted to settle out and returned to the contactor 33 via line 39. The raffinate from the settler 38 can then be introduced via line 40 into a stripper 41, which is provided with a heating coil 42, wherein hydrogen fluoride and light hydrocarbons, such as propane, butane and the like are distilled from the raffinate. A top temperature of about 100° F. to about 125° F. is suitably maintained in the stripper 41. The raffinate, stripped of hydrogen fluoride and light hydrocarbons, can be withdrawn from the stripper 41 via line 43, while the hydrogen fluoride and light hydrocarbons are taken overhead from the stripper 41 via line 44 and condenser 45 and introduced into a receiver 46, provided with a vent 47. If desired, the hydrogen fluoride and light hydrocarbons in the receiver 46 may be recycled to the contactor 33 via pump 48 and line 49.

The extract from the contactor 33 comprising aqueous hydrogen fluoride and sludge-like material can be withdrawn from the contactor 33 via line 50 and introduced into stripper 51 provided with heating coils 52 in the bottom portion thereof and dephlegmating coils 53 in the upper portion thereof. A bottom temperature of about 250° F. to about 300° F. is suitably maintained in the stripper 51 while a top temperature of about 100° F. to about 125° F. is maintained in the upper portion thereof. Anhydrous hydrogen fluoride is taken overhead from the stripper 51 via line 54 and condenser 55 and passed into the hydrogen fluoride receiver 34. The extract, freed of hydrogen fluoride, can be withdrawn from the bottom of the stripper 51 via line 56.

Water accidentally entering contactor 33 finds its way to stripper 51. To remove it, a side cut of hydrogen fluoride from the stripper 51 is withdrawn through a line 57 and introduced into a side stripper 58 provided with a heating coil 59 to maintain a temperature somewhat below 248° F. therein. A hydrogen fluoride-water azeotrope is withdrawn from the bottom of side stripper 58 via line 60 and, if desired, recycled to the crude oil pretreating stage via line 16. Hydrogen fluoride from the side stripper 58 passes off overhead via line 61 and is returned to the stripper 51.

Hydrogen fluoride-water azeotrope from other sources can be introduced into the system via line 62 and excess HF—H₂O can be withdrawn at this point.

Although I have exemplified my invention by reference to the removal of water and salts from crude petroleum oil, the invention is applicable to the removal of salts from reduced crude petroleum oils. While I have illustrated and described a method of carrying out my invention, other variations and modifications can be made therein without departing from the spirit of the invention or the scope of the appended claims.

I claim:

1. The method of removing water and inorganic salts from crude oil containing the same comprising contacting said crude oil with a hydrogen fluoride-water mixture containing not more than 50% HF, separating an oil phase comprising crude petroleum oil substantially free of water and inorganic salts, and an aqueous phase comprising hydrogen fluoride, water and inorganic fluorides.

2. The method of removing water and inorganic salts from crude oil as described in claim 1 in which the inorganic salts are selected from the group consisting of alkali metal chlorides and alkaline earth chlorides.

3. The method of removing water and inorganic salts comprising inorganic chlorides from a crude petroleum oil containing the same, comprising contacting said crude oil with a hydrogen fluoride-water mixture in an amount and for a time sufficient to convert said chlorides to fluorides with the formation of hydrogen chloride, separating an oil phase comprising substantially crude petroleum oil substantially free of water and inorganic salts, and an aqueous phase, comprising hydrogen fluoride, water and inorganic fluorides, and removing said hydrogen chloride from the system.

4. The method of removing water and inorganic salts comprising inorganic chlorides from a crude petroleum oil containing the same, comprising contacting said crude oil with a hydrogen fluoride-water mixture in sufficient quantities and under conditions to convert said chlorides to fluorides with the formation of hydrogen chloride, removing hydrogen chloride from the contacting zone, separating an oil phase comprising crude petroleum oil substantially free of water and inorganic salts and an aqueous phase comprising hydrogen fluoride, water and inorganic fluorides.

5. The method of removing water and inorganic salts from crude petroleum oil as described in claim 4 in which the inorganic chlorides are selected from the group consisting of alkali metal chlorides and alkaline earth chlorides.

6. The method of removing water and inorganic salts comprising inorganic chlorides from crude petroleum oil comprising contacting said crude oil with a hydrogen fluoride-water mixture containing not more than 50% HF, in sufficient quantities and under conditions to convert said chlorides to fluorides with the formation of hydrogen chloride, separating an oil phase, comprising said crude oil substantially free of inorganic salts, and an extract phase comprising aqueous hydrogen fluoride and inorganic fluorides, removing hydrogen chloride from the contacting zone, separating the oil phase from the extract phase, separating a hydrogen fluoride water azeotrope mixture from said extract, and recycling said hydrogen fluoride water azeotrope mixture to said contact zone.

7. The method of removing water and inorganic salts comprising inorganic chlorides from a crude petroleum oil containing the same comprising contacting said crude oil in a contacting zone with a hydrogen fluoride-water azeotrope mixture in sufficient quantities and under conditions to convert said chlorides to fluorides, with the formation of hydrogen chloride, and to form a diphasic separation of a raffinate phase comprising said crude oil substantially free of water and inorganic salts and an extract phase comprising aqueous hydrogen fluoride and inorganic fluorides, removing hydrogen chloride from the system, separating said raffinate from said extract, contacting said raffinate with liquid anhydrous hydrogen fluoride in sufficient quantities to form a diphasic separation of a second raffinate phase, and a second extract phase comprising substantially anhydrous hydrogen fluoride, separating anhydrous hydrogen fluoride, and hydrogen-fluoride water azeotrope fraction from said second extract, separating a hydrogen fluoride-water azeotrope mixture from said first extract, and recycling said hydrogen fluoride-water azeotrope mixtures to said first crude oil contacting zone.

8. The method of removing water and inorganic salts from a crude petroleum oil as described in claim 7 in which the inorganic chlorides are selected from the group consisting of alkali metal chlorides and alkaline earth chlorides.

9. The method of desalting a crude petroleum oil containing inorganic chlorides comprising contacting said crude oil with a hydrogen-fluoride-water azeotrope mixture in an amount and for a time sufficient to convert said fluorides to chlorides with the formation of hydrogen chloride, and removing said hydrogen chloride.

10. The method of desalting the crude petroleum oil as described in claim 9 in which the inorganic chlorides are selected from the group consisting of alkali metal chlorides and alkaline earth chlorides.

11. The method of refining crude petroleum containing undesirable salts and water which comprises extracting said salts and water from said oil by contacting with aqueous hydrofluoric acid of not more than 50% concentration, treating the resulting extracted oil with substantially anhydrous HF to dissolve aromatic constituents therefrom and produce an aromatic extract and a refined oil, recovering anhydrous HF from said oil and said aromatic extract and recycling it to said treating operation, and recovering a constant boiling HF-water azeotropic mixture from said aromatic extract for recycle to said first extraction step.

VANDERVEER VOORHEES.